United States Patent [19]

Kamerman

[11] Patent Number: 4,849,996
[45] Date of Patent: Jul. 18, 1989

[54] PHASE PERTURBATION COMPENSATION SYSTEM

[75] Inventor: Adriaan Kamerman, TA Nieuwegein, Netherlands

[73] Assignee: NCR Corporation, Dayton, Ohio

[21] Appl. No.: 247,807

[22] Filed: Sep. 22, 1988

[30] Foreign Application Priority Data

Mar. 10, 1988 [GB] United Kingdom ............... 8805767

[51] Int. Cl.$^4$ .............................................. H04L 7/04
[52] U.S. Cl. ...................................... 375/118; 375/13; 375/103
[58] Field of Search ............... 375/118, 103, 120, 106, 375/13, 14, 97; 333/18

[56] References Cited

U.S. PATENT DOCUMENTS

| | | | |
|---|---|---|---|
| 4,273,955 | 6/1981 | Armstrong | 178/696 |
| 4,301,417 | 11/1981 | Jansen et al. | 329/50 |
| 4,320,526 | 3/1982 | Gitlin | 375/118 |
| 4,362,997 | 12/1982 | van Driest | 329/50 |
| 4,528,519 | 7/1985 | van Driest | 330/279 |
| 4,530,104 | 7/1985 | Kamerman | 338/18 |
| 4,577,334 | 3/1986 | Boer et al. | 375/97 |
| 4,606,045 | 8/1986 | Miller | 375/13 |
| 4,792,964 | 12/1988 | Yoshida | 375/118 |

FOREIGN PATENT DOCUMENTS

| | | |
|---|---|---|
| 0153194 | 2/1985 | European Pat. Off. . |
| 0169548 | 7/1985 | European Pat. Off. . |
| 0180066 | 7/1985 | European Pat. Off. . |
| 0173569 | 8/1985 | European Pat. Off. . |
| 0185332 | 12/1985 | European Pat. Off. . |
| 0204308 | 6/1986 | European Pat. Off. . |
| 0213224 | 3/1987 | European Pat. Off. . |
| 2175480 | 5/1985 | United Kingdom . |
| 2174274 | 10/1985 | United Kingdom . |

OTHER PUBLICATIONS

Bennett, W. R. and Davey, J. R.; Data Transmission; McGraw-Hill, New York, 1965; pp. 182–190.
Lucky, R. W., Salz, Jr. and Weldon, E. J.; Principles of Data Communication; McGraw-Hill, New York, 1968; pp. 226–232.
Bird, J. S.; Error Performance of Binary NCFSK in the Presence of Multiple Tone Interference and System Noise: IEEE Transaction on Communications, vol. COM-33, No. 3, Mar. 1985; pp. 203–209.
Sundberg, C. E.; Continuous Phase Modulation; IEEE Communications Magazine, vol. 24, No. 4, Apr. 1986; pp. 25–38.
Ansari, R. and Liu, B.; A Class of Low Noise Computationally Efficient Recursive Digital Filters; Proceedings IEEE International Symposium Circuits and Systems, Apr. 1981; pp. 550–553.
Ansari, R. and Liu, B.; A Class of Low Noise Computionally Efficient Recursive Digital Filters with Applications to Sampling rate Alterations; IEEE Transactions on Acoustics, Speech & Signal Processing, vol. ASSP-33, No. 1, 2/85.

(List continued on next page.)

Primary Examiner—Robert L. Griffin
Assistant Examiner—Marianne Huseman
Attorney, Agent, or Firm—Wilbert Hawk, Jr.; Albert L. Sessler, Jr.; Richard W. Lavin

[57] ABSTRACT

In a phase perturbation compensation system for use in a data modem receiver, the signal from an equalizer is fed to a phase and amplitude correction circuit which is connected to a decision circuit providing a data output signal and a phase error output signal which is applied to a phase jitter compensation determination circuit. The phase jitter compensation determination circuit includes a tapped delay line the output taps of which are applied to multipliers fed with adaptive weighting coefficients to provide values which are summed to provide a phase error prediction signal. The weighting coefficients are generated in integrator circuits which include respective delays. The values generated in the delays during an initial training sequence and stored in a storage device are retrieved for use in subsequent training segments, whereby fast phase jitter adaptation is achieved and hence stort training sequences can be utilized.

15 Claims, 8 Drawing Sheets

OTHER PUBLICATIONS

Jennings, F.; Practical Data Communications—Modems, Networks, Protocols; Blackwell Scientific Publications, Oxford, 1986, p. 48.

Godard, D. N.; Pass-Band Timing Recovery in an All-Digital Modem Receiver; IEEE Transactions on Communications, vol. COM-26, No. 5; May 1978.

Abramowitz, M., Stegun, J. A., Handbook of Mathematical Functions; Dover Publications Inc., New York, 1972; formula 4.3.100, p. 76.

Idem Reference Abramowitz, M., Stegun, J. A.; formula 25.2.6, 25.2.7, p. 878.

CCITT—Data Communication over the Telephone Network—vol. VIII—Fascicle VIII.1—Recommendations of the V-Series; Geneva 1985, Recommendation V29; pp. 203-215.

Carey, M. B., Chen, H. T.; Descloux, A., Ingle, J. F. and Clark K. I.; 1982/83 End Office Connection Study—AT&T Bell Laboratories Technical Journal, vol. 63, No. 9, Nov. 1984; pp. 2059-2119.

Motorola Inc., 2605 Series Data User Manual, Aug. 1984, Motorola Inc., Mansfield, Mass.

Racal Milgo's 14400 Bit/s System Modem Omnimode 14.4 Manual.

PHASE PERTURBATION COMPENSATION SYSTEM

BACKGROUND OF THE INVENTION

1. Field of the Invention.

This invention relates to a phase perturbation compensation system for compensating a phase-perturbed signal in a data modem.

The invention has a particular application to high-speed modems in switched carrier configurations, such as multi-point networks and half-duplex point-to-point configurations. It is desirable in such networks and configurations for training sequences, which are applied at the commencement of transmissions, to be as short as possible.

One problem which arises in modem communication systems is that the communication channel introduces various kinds of deterioration, including carrier phase jitter and carrier frequency offset. For instance, phase jitter introduced on transmission lines such as telephone lines used for data communication is caused by AC ripple in the DC power supply for oscillators used in carrier systems, by incomplete band filtering, and by imperfections in quantization in digital systems. Frequency offset on transmission lines such as telephone lines used for data communication is caused in FDM (Frequency Division Multiplex) systems, since on most long haul lines there is a slight difference in frequency between the modulating and the demodulating carriers. High values for phase jitter and frequency offset can occur, particularly on long haul telephone lines such as are used for half-duplex point-to-point communication.

In both multipoint and half-duplex point-to-point configurations successive transmissions generally start at random instants. Therefore, it is not possible to start in a phase jitter compensation circuit from the state with previously acquired values and to continue tracking.

2. Description of the Prior Art.

U.S. Pat. No. 4,320,526 discloses an adaptive phase jitter compensator which includes a filter section which receives a derived phase error signal and its own weighted sum output to provide the difference between them as noisy estimates of the actual phase via taps of a delay line. A multiplier receives each tap signal to form a product used to update the tap weights used in the filter section. An up-modulator modulates a carrier signal with the weighted sum output, the up-modulator output being applied to a look-up table to form components compatible with the received data signal. A complex multiplier multiplies these components and the equalized data signal to provide both demodulation and phase jitter compensation.

SUMMARY OF THE INVENTION

There is provided a phase perturbation compensation system for compensating a phase-perturbed signal in a data modem, characterized by phase jitter compensation means adapted to receive a phase error signal and including a tapped delay line having a plurality of output tapes, weighting means including a corresponding plurality of weighting coefficient generating means adapted to adaptively generate and to apply respective weighting coefficients to said plurality of output taps, thereby forming a plurality of weighted tap signals, summing means adapted to sum said weighted tap signals thereby providing a phase error prediction signal and feedback means adapted to feed back said error prediction to input means of said tapped delay line; reference signal determination means responsive to said phase error prediction means to provide a reference signal; error correction means adapted to correct said phase-perturbed signal in dependence on said reference signal and storage means adapted to store a plurality of parameters developed in said weighting coefficient generating means during an initial modem training sequence and to restore the stored parameters to said weighting coefficient generating means during a subsequent modem training sequence. The storage and retrieval of the weighting coefficient parameters enables the achievement of a very rapid adjustment of the phase jitter compensation means to achieve proper tracking.

It is thus an object of the present invention to provide a phase perturbation compensation system which achieves fast and reliable phase jitter compensation.

BRIEF DESCRIPTION OF THE DRAWINGS

Additional advantages and meritorious features of the present invention will be apparent from the following detailed description and appended claims when read in conjunction with the drawings, wherein like numerals identify corresponding elements.

DESCRIPTION OF THE PREFERRED EMBODIMENT

Figure 1:
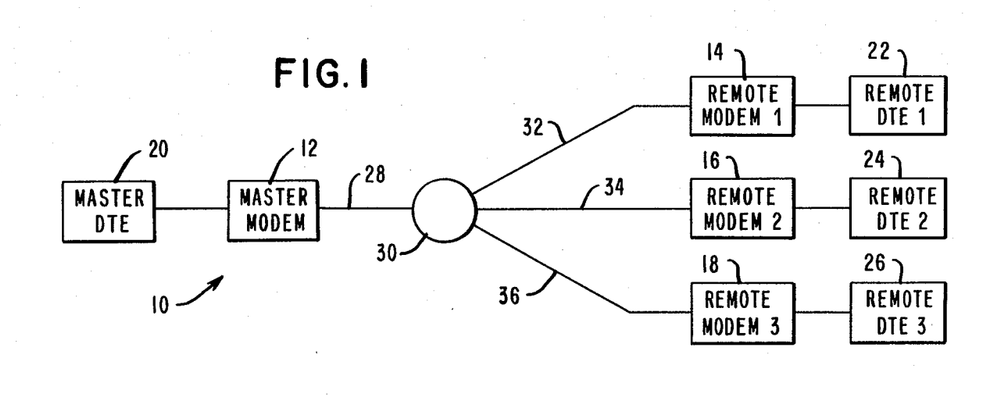
FIG. 1 is a block diagram of a multipoint data modem communication system including a master modem and a plurality of remote modems.

Referring to FIG. 1, there is shown a multipoint data modem communication system 10 including a master modem 12 and three remote modems 14, 16 and 18. In practice, a greater or lesser number of remote modems may be employed. The master modem 12 is connected to a master data terminal equipment (DTE) unit 20 and the remote modems 14, 16 and 18 are connected to remote DTE units 22, 24 and 26. The master modem 12 is connected over a 4-wire telephone transmission line 28 to a branch point 30 which is connected over 4-wire telephone transmission lines 32, 34 and 36 to the respective modems 14, 16 and 18. As is conventional, each of the 4-wire telephone transmission lines 28, 32, 34 and 36 includes a transmit pair of lines and a receive pair of lines. Data is normally transmitted at a data bit rate of 14,400 bits per second, using a carrier frequency of 1800 Hz and a modulation frequency of 2400 Hz (symbol rate of 2400 baud). The modems operate with a sample clock frequency having a nominal value of 9600 Hz, that is, four times the modulation frequency.

Figure 2:
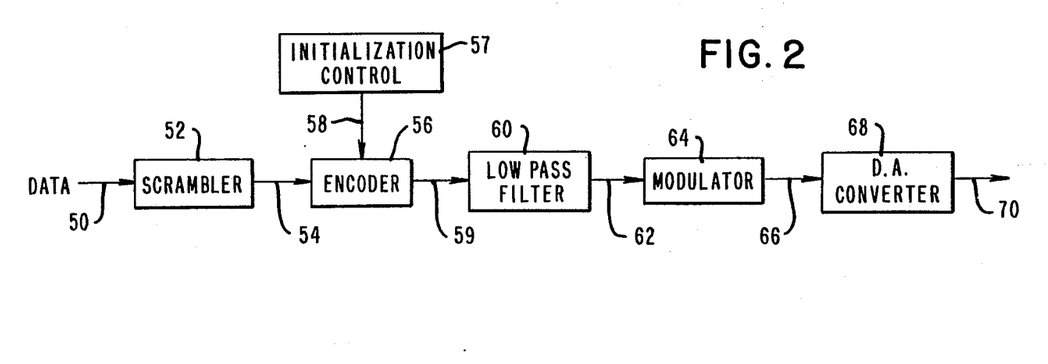
FIG. 2 is a block diagram of a remote modem transmitter.

Referring now to FIG. 2, there is shown a block diagram of the modem transmitter section of one of the modems 14, 16 or 18 shown in FIG. 1. Data signals from the associated data terminal equipment (DTE) are applied over an input line 50 to a scrambler 52. The output of the scrambler 52 is connected over a line 54 to an input of an encoder 56. An initialization control circuit 57 is connected over a line 58 to the encoder 56. The initialization control circuit 57 enables the encoder 56 to provide training signals as will be described hereinafter. The output of the encoder 56 is connected over a line 59 to a low-pass filter 60 the output of which is connected over a line 62 to a modulator 64. The output of the modulator 64 is connected over a line 66 to a digital-to-analog converter 68 which has an output 70 connected to the associated telephone transmission line (not shown).

Figure 3:
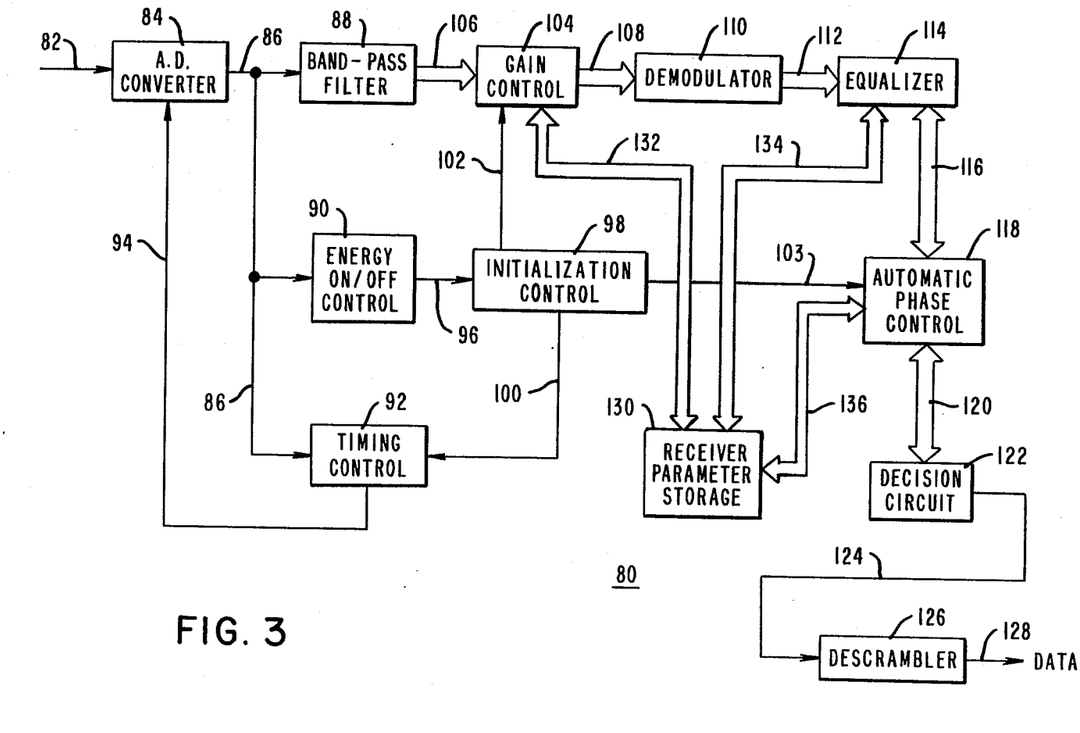
FIG. 3 is a block diagram of the master modem receiver.

Referring to FIG. 3, there is shown a block diagram of the master modem receiver 80. The signal received from the associated transmission line is applied over an input line 82 to an analog-to-digital converter 84 forming digital sampling means. The analog-to-digital converter 84 is connected over a line 86 to a band-pass filter 88, an energy on/off control circuit 90 and a timing recovery circuit 92. The timing recovery circuit 92 is connected over a line 94 to the analog-to-digital converter 84 to control the sampling times. The energy on/off control circuit 90 is connected over a line 96 to an initialization control circuit 98. The initialization control circuit 98 is connected over a line 100 to the timing recovery circuit 92 and over a line 102 to a gain control circuit 104, which is also connected to the output of the band-pass filter 88 over a bus 106. The bus 106 transmits complex-valued signals, as is indicated by the double line symbol. It should be understood that when the energy on/off control circuit 90 detects energy on the line 86, it provides a signal over line 96 to initiate operation of the initialization control circuit 98. The initialization control circuit 98 provides control signals over the control lines 100, 102, 103 to the timing recovery circuit 92, the gain control circuit 104, and an automatic phase control circuit 118.

The gain control circuit 104 is connected over a bus 108 to a demodulator 110 which is connected over a bus 112 to an equalizer 114. The equalizer 114 is connected over a bidirectional bus 116 to the automatic phase control circuit 118 which is connected over a bidirectional bus 120 to a decision circuit 122. The automatic phase control circuit 118 receives a RESET input over the line 103 from the initialization control circuit 98. The decision circuit 122 is connected over a line 124 to a descrambler 126 which has an output line 128 on which DATA signals are provided representing data received by the modem receiver 80.

Also included in the modem receiver 80 is a receiver parameter storage unit 130 which is connected over bidirectional buses 132, 134, 136 to the gain control circuit 104, the equalizer 114 and the automatic phase control circuit 118. The receiver parameter storage unit 130 is used to store equalizer coefficients and receiver parameters at locations associated with the respective transmitting modems during initial training sequences and to retrieve the stored coefficients and parameters during subsequent training sequences. The acquired parameters are stored at locations corresponding to the particular remote modem which generated these parameters. It should be understood that the present invention is concerned essentially with the automatic phase control circuit 118, which will be described in detail hereinafter, and that a detailed understanding of the remaining circuits shown in FIG. 3 is not essential for an understanding of the present invention. Consequently such circuits will not be described in detail herein.

At the commencement of the first transmission by each of the remote modems 14, 16 and 18, there is transmitted an initial training sequence consisting of six segments $SG_1$–$SG_6$ inclusive, as shown in Table 1:

TABLE 1

| | Initial Training Sequence | | | | | |
|---|---|---|---|---|---|---|
| | $SG_1$ | $SG_2$ | $SG_3$ | $SG_4$ | $SG_5$ | $SG_6$ |
| (1) | 256 | 2976 | 128 | 78 | 48 | 48 |
| (2) | 107 | 1240 | 53 | 32 | 20 | 20 |

In Table 1 the first line (1) denotes the number of symbol intervals in the respective segments $SG_1$ to $SG_6$ inclusive and the second line (2) denotes the corresponding approximate time in milliseconds. The segments are designated as follows:
$SG_1$: Segment 1: Alternations (180° phase alternations)
$SG_2$: Segment 2: Equalizer Conditioning Pattern
$SG_3$: Segment 3: Configuration Sequence
$SG_4$: Segment 4: Alternations (180° phase alternations)
$SG_5$: Segment 5: Equalizer Conditioning Pattern
$SG_6$: Segment 6: Scrambled All Binary 1's.

It will be appreciated that the total number of symbol intervals in the initial training sequence is 3534, corresponding to a total time of 1472 milliseconds approximately. Segments $SG_1$, $SG_2$ and $SG_6$ are conventional training signal segments, corresponding with CCITT Recommendation V.33. Segment $SG_3$ contains information relating to set-up conditions such as the data bit rate, the nature of the modulation, and other transmission-related parameters. The segment $SG_4$ is utilized in calculations related to timing adjustment. The segment $SG_5$ provides a slight readjustment of the equalizer coefficients which is needed as a result of transmitting the segment $SG_3$.

As mentioned above, during the initial training sequence the master modem receiver 80 acquires operating parameters and equalizer coefficients and stores these parameters and coefficients in the receiver parameter storage unit 130 at a location associated with the transmitting remote modem. Each subsequent transmission by the remote modem commences with a short training signal, referred to as a subsequent training sequence consisting of two segments, as shown in Table 2:

TABLE 2

| | Subsequent Training Sequence | | |
|---|---|---|---|
| | Segment 1 Alternations | Segment 2 Predefined Symbols | Total |
| No. of symbol intervals | 25 | 48 | 73 |
| Approximate time in | 10.4 | 20 | 30.4 |

TABLE 2-continued

| Subsequent Training Sequence | | |
|---|---|---|
| Segment 1 Alternations | Segment 2 Predefined Symbols | Total |
| milliseconds | | |

Thus, the subsequent training sequence consists of a first segment formed by 25 symbol intervals of 180° phase alternations followed by a second segment of 48 symbol intervals of predefined symbols. The remote modem may be identified by transmitting a set of identifying frequencies in synchronism with segment 1 of the subsequent training sequence. Thus, the previously stored receiver parameters and coefficients can be retrieved from the identified location in the receiver parameter storage unit 130.

Figure 4:
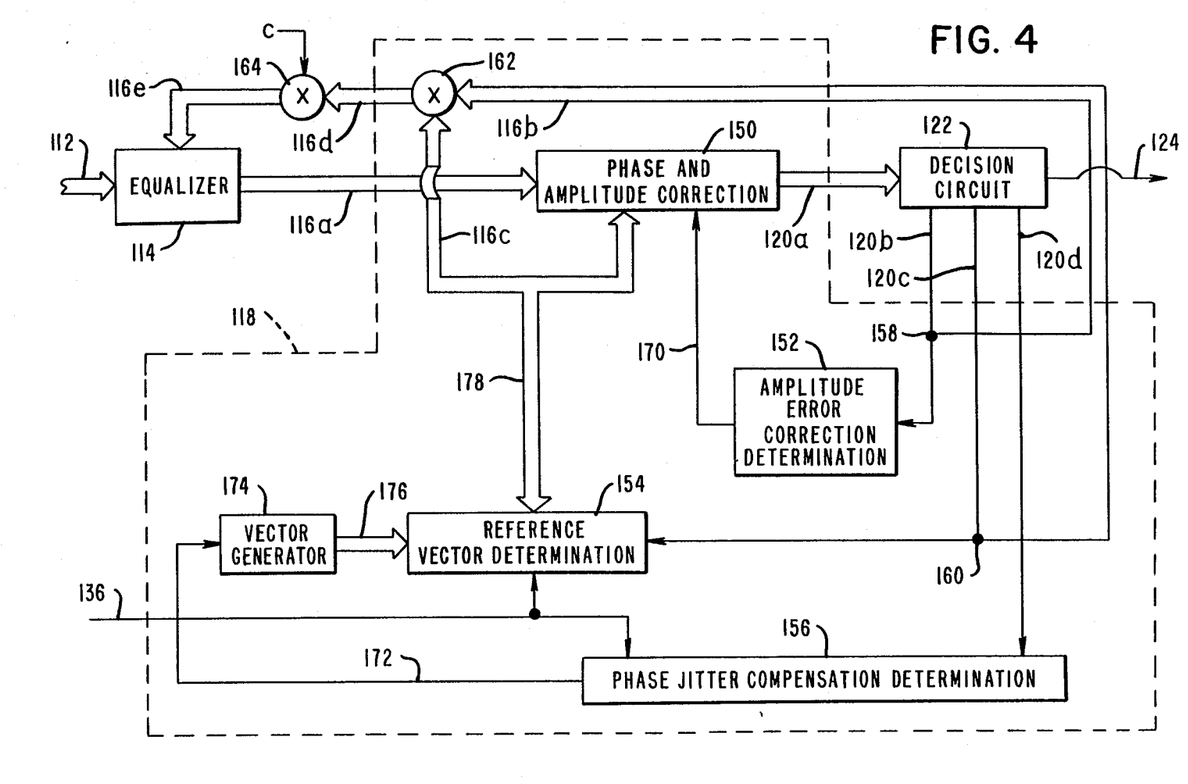
FIG. 4 is a more detailed block diagram of the automatic phase control circuit shown in FIG. 3.

Referring now to FIG. 4, there is shown a block diagram of the automatic phase control circuit 118 and its connections with the equalizer 114 and the decision circuit 122. The output of the equalizer 114 is connected over a bus 116a forming part of the bus line 116 (FIG. 3) to a phase and amplitude correction circuit 150 having an output connected over a bus 120a forming part of the bus line 120 (FIG. 3) to the decision circuit 122. The decision circuit 122 has an output line 120b which carries a signal representing the amplitude error (or in-phase error), an output line 120c which carries a signal representing quadrature error and an output line 120d which carries a signal representing phase error. The lines 120b, 120c and 120d form part of the bus 120 (FIG. 3), and are connected respectively to an amplitude error correction determination circuit 152, a reference vector determination circuit 154 and a phase jitter compensation determination circuit 156. Connections are made at nodes 158 and 160 between the lines 120b and 120c and a bus 116b which thereby carries a complex-valued signal. The bus 116b is connected as a first input line of a complex conjugate multiplier 162, which has a second input bus 116c from the reference vector determination circuit 154, and an output bus 116d connected to a multiplier 164 to which is also applied a constant value c. The complex multiplier 162 multiplies the complex-valued input on the bus 116b by the complex conjugate of the complex-valued input on the bus 116c. Thus, the imaginary part of the complex-valued signal on the bus 116c is inverted by an inverter (not shown) prior to multiplication. The output of the multiplier 164 is connected over a bus 116e to the equalizer 114.

The amplitude error correction determination circuit 152 is connected over a line 170 to the phase and amplitude correction circuit 150. The phase jitter compensation determination circuit 156 has an output connected over a line 172 to a vector generator circuit 174, which has a complex-valued output connected to bus 176 to the reference vector determination circuit 154. The complex-valued output of the reference vector determination circuit 154 is connected over a bus 178 to the phase and amplitude correction circuit 150 and to the bus 116c forming the second input to the complex multiplier 162. With this arrangement, it will be appreciated that the error feedback for the equalizer 114 which is effected over the buses 116b, 116d and 116e is provided with a proper backwards rotation.

Figure 5:
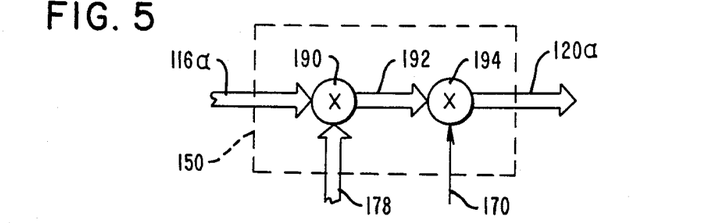
FIG. 5 is a diagram of the phase and amplitude correction circuit shown in FIG. 4.

Referring now to FIG. 5, there is shown a detailed diagram of the phase and amplitude correction circuit 150 (FIG. 4). The complex-valued output of the equalizer 114, on the bus 116a, is applied to a complex multiplier 190, which also receives the complex output of the reference vector determination circuit 154, on the bus 178. The multiplier 190 effects a phase correction, using the output from the reference vector determination circuit 154. The complex-valued output of the multiplier 190 is applied over a bus 192 to a multiplier 194 which also receives the output of the amplitude error correction determination circuit 152 over the line 170. Thus, the multiplier 194 effects an amplitude error correction using the output of the amplitude error correction determination circuit 152.

Figure 6:
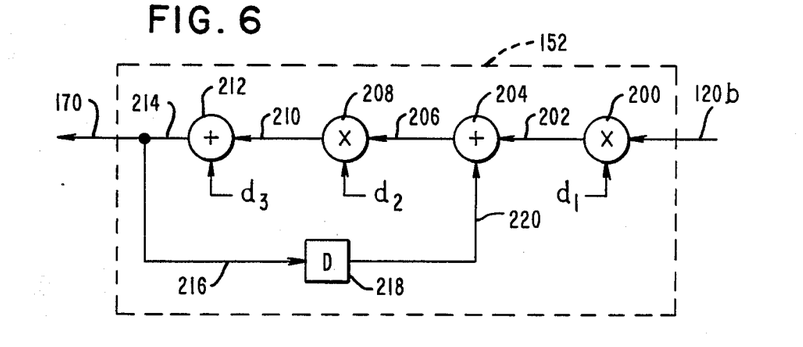
FIG. 6 is a diagram of the amplitude error correction determination circuit shown in FIG. 4.

Referring now to FIG. 6, there is shown a detailed diagram of the amplitude error correction determination circuit 152 (FIG. 4). The input line 120b is connected to a multiplier 200 which also receives a coefficient value $d_1$. The output of the multiplier 200 is connected over a line 202 to an adder 204, the output of which is applied over a line 206 to a multiplier 208 which also receives a coefficient value $d_2$. The output of the multiplier 208 is applied over a line 210 to an adder 212 to which is applied a coefficient value $d_3$. The output of the adder 212 is applied over a line 214 to the output line 170 of the circuit 152, and via a feedback line 216 to a delay 218, the output of which is connected over a line 220 to an input of the adder 204.

The operation of the amplitude error correction determination circuit 152 approximates that of a leaky integrator. The circuit 152 adapts quickly to compensate for amplitude errors and adapts slowly by leakage towards a target value of 0.5. It should be understood that the gain control in the modem receiver 80 is derived from three separate contributions. A first contribution is provided by the gain control circuit 104 (FIG. 3). A second contribution is provided by the amplitude correction discussed hereinabove with reference to FIG. 5. A third, small contribution is provided in the equalizer 114. In the circuit 152 (FIG. 6), the following coefficient values are utilized:

$d_1 = 0.0150$
$d_2 = 0.9998$
$d_3 = 0.0001$

There is a target value of 0.5 for the output of the amplitude error correction determination circuit 152. The circuit 152 has internal feedback through the delay element 218, which also has the target value of 0.5. The circuit 152 adapts its output quickly to compensate for an amplitude error such as a small, abrupt change of telephone line attenuation. Next, the circuit 152 adapts slowly by leakage and returns slowly to its target value of 0.5. During this time, the gin control circuit 104 (FIG. 3) adapts slowly to a new gain for level normalization following the aforementioned small, abrupt change of telephone line attenuation.

Figure 7:
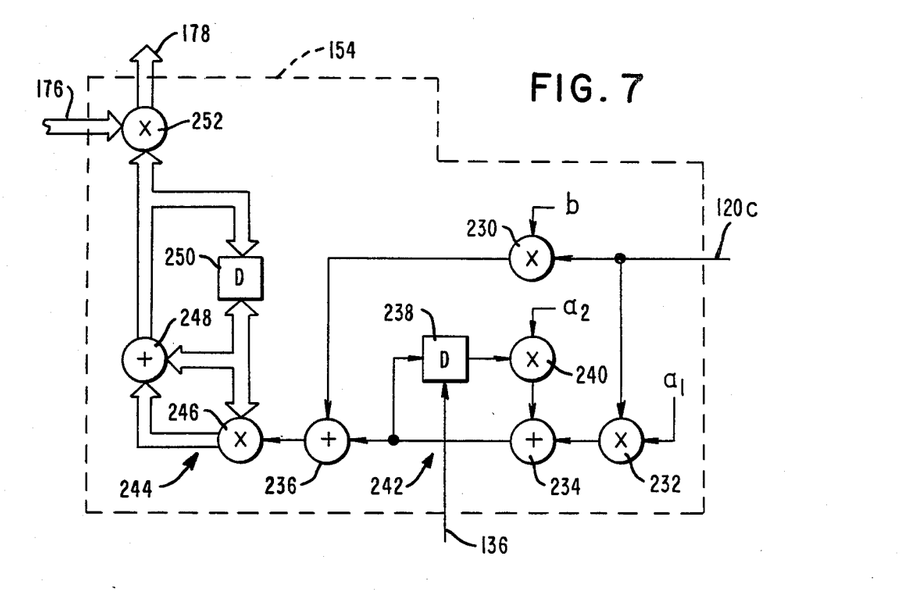
FIG. 7 is a diagram of the reference vector determination circuit shown in FIG. 4.

Referring now to FIG. 7, there is shown a detailed diagram of the reference vector determination circuit 154 (FIG. 3). The input line 120c is connected to multipliers 230 and 232 which have coefficients b and a1 applied thereto, respectively. The output of the multiplier 232 is connected to an adder 234 which has an output connected to an adder 236 and to a delay 238. The output of the delay 238 is connected to an input of a multiplier 240 to which is applied a coefficient $a_2$, and which has an output connected to an input of the adder 234. The output of the multiplier 230 is connected to an input of the adder 236. It will be appreciated that the components 232, 234, 238 and 240 function as a leaky integrator 242 for the averaged quadrature error feedback and the multiplier 230 functions for proportional quadrature error feedback. The output of the adder 236 is connected to an complex-valued feedback loop 244 which includes a multiplier 246, an adder 248 and a delay 250, connected as shown in FIG. 7. The output of the adder 248 is connected to a complex multiplier 252 which also receives an input over the bus 176 from the vector generator 174 (FIG. 4), and which provides compensation for phase jitter that is present in the output of the reference vector determination circuit 154 (FIG. 4).

Figure 8A:
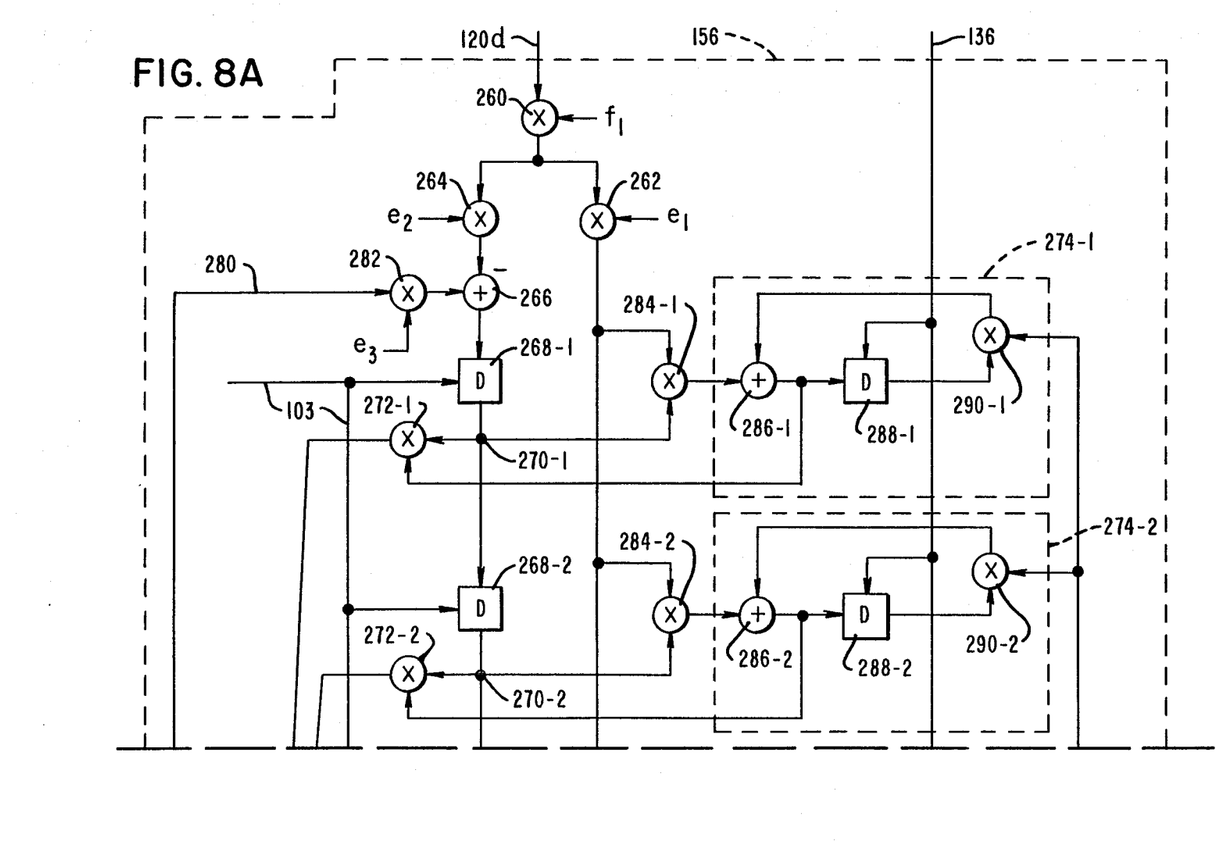
FIGS. 8A and 8B, taken together, constitute a diagram of the phase jitter compensation determination circuit shown in FIG. 4.
Figure 8B:
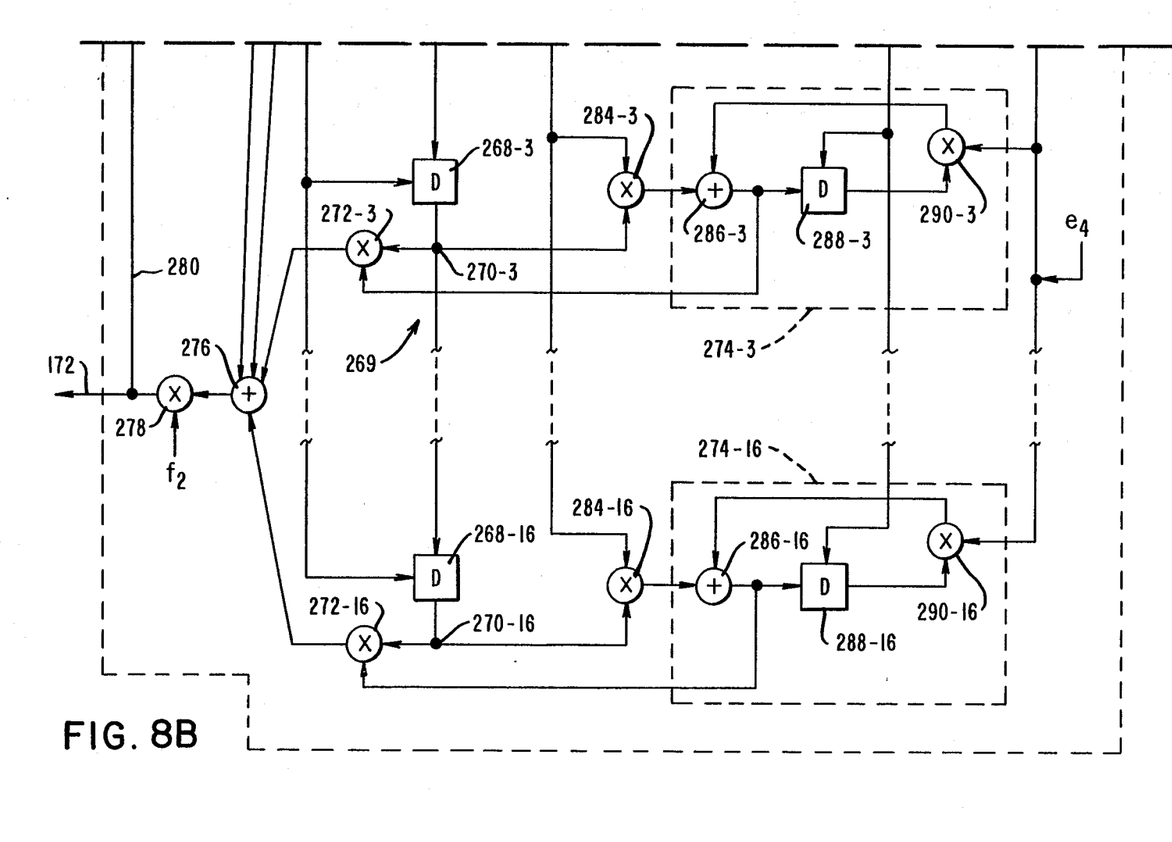

Referring now to FIGS. 8A and 8B, there is shown a detailed diagram of the phase jitter compensation determination circuit 156 (FIG. 4). The input line 120$d$ is connected to a multiplier 260 which also receives a coefficient value $f_1$, and which has an output connected to multipliers 262, 264 which receive coefficient values $e_1$, $e_2$, respectively. It will be appreciated that the multipliers 260, 262 and 264 provide gain adaptation. The output of the multiplier 264 is connected to a subtractive input of an adder 266, the output of which is connected to the first delay 268-1 of a chain of sixteen delays 268-1 to 268-16 inclusive constituting a tapped delay line 269 having tap nodes 270-1 to 270-16 inclusive which are connected to respective multipliers 272-1 to 272-16 inclusive. The multipliers 272-1 to 272-16 inclusive receive inputs from respective leaky integrator circuits 274-1 to 274-16 inclusive which provide adaptive weighting factors in the form of coefficient values for the multipliers 272-1 to 272-16 inclusive. It should be understood that a greater or lesser number of delays and leaky integrator circuits may be utilized in alternative arrangements.

The outputs of the multipliers 272-1 to 272-16 inclusive (FIGS. 8A and 8B) are commonly connected to an adder 276 (FIG. 8B) which has an output connected to an input of a multiplier 278 which also receives the coefficient value $f_2$. The output of the multiplier 278 forms a phase error prediction signal which is applied to the output line 172. The output of the multiplier 278 is also connected via a feedback line 280 to an input of a multiplier 282 (FIG. 8A) which receives the coefficient value $e_3$. The output of the multiplier 282 is connected to an input of the adder 266. It will be appreciated that the output signal from the multiplier 282 corresponds to the phase jitter prediction after a gain adaptation, and that the output of the adder 266 corresponds to the noisy actual phase error.

The output of the multiplier 262 is connected to first inputs of multipliers 284-1 to 284-16 inclusive which have second inputs connected to the nodes 270-1 to 270-16 inclusive. The outputs of the multipliers 284-1 to 284-16 inclusive are connected respectively to the leaky integrator circuits 274-1 to 274-16 inclusive which include respective adders 286-1 to 286-16 inclusive, delays 288-1 to 288-16 inclusive and multipliers 290-1 to 290-16 inclusive. The multipliers 290-1 to 290-16 inclusive receive a common coefficient value $e_4$, constituting the leakage factor. With this arrangement it will be appreciated that the outputs of the delays 268-1 to 268-16 inclusive are correlated with the output of the multiplier 262, with the correlation being effected by multiplication and integration.

It should be understood that the line 136 is connected to the delays 288-1 to 288-16 inclusive in the leaky integrators 274-1 to 274-16 inclusive, such that the delay values acquired during initial training can be stored in the receiver parameter storage unit 130 (FIG. 3) and restored to these delays at the commencement of subsequent training. It should also be understood that at the commencement of subsequent training, the delays 268-1 to 268-16 inclusive are cleared in response to a RESET signal on the line 103. Thus, during subsequent training, the leaky integrators 274-1 to 274-16 inclusive provide weighting factors which are initially set and then updated synchronously. This is effected by multiplication of the phase error signal on the line 120$d$ (after gain adaptation by factors $f_1$, $e_1$ in the multipliers 260, 262) with the noisy estimate of the actual phase error shifted through the delays 268-1 to 268-16 inclusive. The leaky integrators 274-1 to 274-16 operate as accumulators which store and update the weighting factors for the multipliers 272-1 to 272-16 inclusive. The delays 268-1 to 268-16 inclusive of the delay line 269 contain successive estimates for the actual phase. The adder 276 (FIG. 8B) combines the outputs of the multipliers 272-1 the 272-16 inclusive to provide the weighted sum output.

The values of the various gain factor coefficients referred to above that are applied during the automatic phase control (APC) operations which take place during the last part of the initial training sequence and during subsequent training sequences are as shown in Table 3.

TABLE 3

|  | During last part of initial training | During subsequent training |
|---|---|---|
| initial $e_1$,i | 0.25 | 0.0 |
| decrease $e_1$,d | 0.99976 | 0.99217 |
| final $e_1$,o | 0.125 | 0.125 |
| initial $e_2$,i | 0.21895 | 0.07812 |
| decrease $e_2$,d | 0.99951 | 0.9325 |
| final $e_2$,o | 0.03125 | 0.03125 |
| initial $e_3$,i | 0.99976 | 0.0 |
| decrease $e_3$,d | 0.99927 | 0.875 |
| final $e_3$,o | 0.25 | 0.25 |
| $e_4$ | 0.99997 | 0.99997 |
| $f_1$ | 16.0 | 16.0 |
| $f_2$ | 4.0 | 4.0 |
| $a_1$ | 0.002 | 0.002 |
| $a_2$ | 1.0 | 1.0 |
| b | 0.016 | 0.016 |

It should be understood that the APC operations according to Table 3 commence, for the initial training, at a predetermined time during the segment $SG_2$, Table 1, (for example, 500 symbol intervals after the commencement of the initial training sequence), and, for subsequent training sequences at the commencement of segment 2 of a subsequent training sequence (Table 2). Furthermore, it will be appreciated that the values of $e_1$, $e_2$ and $e_3$ vary during these APC periods, whereas the values of $e_4$, $f_1$, $f_2$, $a_1$, $a_2$ and b are fixed during such periods.

Figures 9A, 9B, 9C, 10:
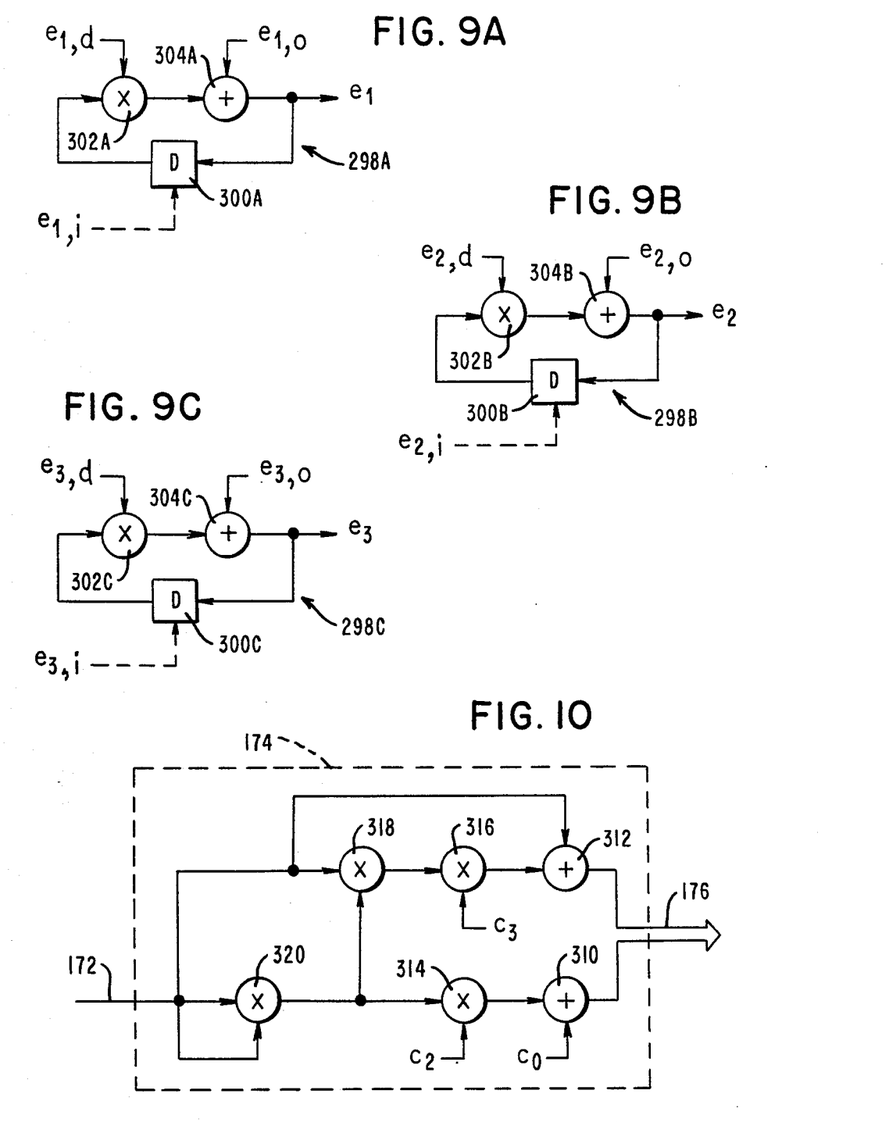
FIGS. 9A-9C inclusive are diagrams of coefficient generating circuits used in generating certain coefficients shown in FIG. 9.
FIG. 10 is a diagram of the vector generator circuit shown in FIG. 4.

Circuits 298A, 298B and 298C for generating values of $e_1$, $e_2$ and $e_3$ which vary in accordance with Table 3 will now be described with reference to Figs. 9A to 9C inclusive. Referring first to FIG. 9A, the circuit 298A includes a delay 300A which is initially set with the value $e_{1,i}$. The output of the delay 300A is connected to a multiplier 302A, which also receives as an input the value $e_{1,d}$. The output of the multiplier 302A is connected to the input of an adder 304A which also receives the coefficient value $e_{1,o}$. The output of the adder 304A provides the output signal representing the coefficient $e_1$, which signal is also fed back to form the input of the delay 300A. With this arrangement, the value of $e_1$ will change from its initial value $e_{1,i}$ to its final value $e_{1,0}$. The value of $e_{1,d}$ is related to the speed at which $e_1$ converges to $e_{1,0}$. The values of $e_{1,i}$, $e_{1,d}$, $e_{1,0}$ are indicated in Table 3. The circuits for generating the coefficients $e_2$ and $e_3$, shown in FIGS. 9B and 9C are identical to the circuit shown in FIG. 9A, with corresponding components identified by B and C suffixes, respectively. The appropriate input values are applied as shown in FIGS. 9B and 9C to generate the coefficients $e_2$ and $e_3$.

Referring now to FIG. 10, there is shown a detailed diagram of the vector generator circuit 174 (FIG. 3), which receives a real-valued input representing a phase error prediction signal on the line 172 and provides a complex-valued output vector on the bus 176. The vector generator circuit includes adders 310, 312 and multipliers 314, 316, 318, 320 connected as shown in FIG. 10. The adder 310 and the multipliers 314 and 316 have coefficients $c_0$, $c_2$ and $c_3$ applied thereto with the following values:

$c_0 = 1.0$
$c_2 = 0.49740$
$c_3 = 0.166147$

These values are derived from the known approximation formulae:

$\cos x = 1 - 0.497401 x^2$
$\sin x = x - 0.166147 x^3$, which for $-0.35 < x < 0.35$, corresponding to a phase jitter level below 40 degrees, give a very accurate approximation.

Figure 11:
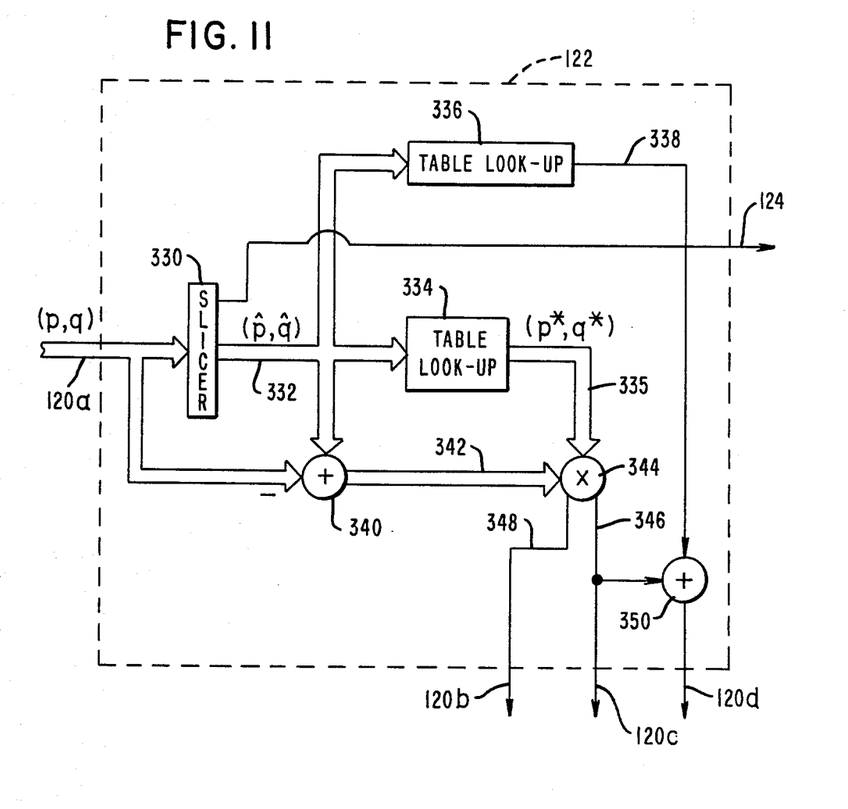
FIG. 11 is a diagram of the decision circuit shown in FIG. 4.

Referring now to FIG. 11, there is shown a detailed diagram of the decision circuit 122 (FIG. 3). The input bus 120a, which carries a complex-valued input signal (p,q) is connected to a slicer 330. The slicer 330 provides, for each new complex-valued input (p,q) an output $(\hat{p},\hat{q})$ on a bus 332, which output corresponds to he target vector point selected from the set of signal vector points of the QAM signal constellation that is nearest to the input vector point. The slicer also provides a data signal on the line 124 corresponding to the data represented by the target vector point. The bus 332 is connected to a table look-up unit 334 which provides on a line 335 an output $(p^* q^*)$ of which the phase corresponds to the phase of $(\hat{p},\hat{q})$ and of which the vector length is equal to 1. The bus 332 is also connected to a table look-up unit 336 which provides on a line 338 a real-valued output corressponding to the inverse of the vector length of $(\hat{p},\hat{q})$. An adder 340 provides on a bus 342 the error signal $(\hat{p},\hat{q}) - (p,q)$ which is applied via the bus 342 as an input to a complex conjugate multiplier 344 which multiplies the value on the bus 342 by a value $(p^*, -q^*)$ derived from the bus 335. The output of the complex multiplier 344 corresponds to the error signal $(\hat{p},\hat{q}) - (p,q)$ after a phase rotation to position the error along the real axis. The imaginary part of the multiplier output is provided on a line 346 and corresponds to the quadrature error. The real part is provided on a line 348. The lines 346, 348 are connected to the lines 120c, 120b, respectively. The line 346 is also connected to an input of a multiplier 350 which has a second input connected to the output line 338 of the table look-up unit 336. The output of the multiplier 350 provides the phase error signal on the line 120d.

In operation, an initial, long training sequence in accordance with Table 1 is applied. Initially, the contents of the delays 268-1 to 268-16 inclusive, and 288-1 to 288-16 inclusive (FIGS. 8A and 8B) in the phase jitter compensation determination circuit 156 (FIG. 4), and the delay 238 (FIG. 7) in the reference vector determination circuit 154 are in a zero condition. During the initial training, the contents of these delays are synthesized to provide optimum compensation. At the conclusions of the initial training the master modem receiver 80 (FIG. 3) acquires receiver parameters and equalizer coefficients which are stored in the receiver parameter storage unit 130. These parameters include the contents of the delays 288-1 to 288-16 inclusive in the phase jitter compensation determination circuit 156, and the delay 238 in the reference vector determination circuit 154, the contents of these delays being transmitted over the bus line 136 to the storage unit 130.

During subsequent transmissions, a short training sequence in accordance with Table 2 is applied. After identification of the remote modem the relevant previously stored parameters and coefficients are reloaded from the storage unit 130, including the values for the delays 288-1 to 288-16 inclusive in the phase jitter compensation determination circuit 156, and the delay 238 in the reference vector determination circuit 154. Thus, the reference vector determination circuit 154, which effects frequency shift compensation, is loaded immediately with the appropriate value for the delay 238. Also, the phase jitter compensation determination circuit 156 is loaded immediately with the appropriate values for the weighting coefficients in the delays 288-1 to 288-16 inclusive.

The delay line elements 268-1 to 268-16 inclusive of the delay line 269 (FIG. 8B) start from zero since there is no estimate of the actual phase because the phase of the phase jitter fluctuation is unknown. Next, the phase jitter compensation determination circuit 156 can train fast during the 48 predefined symbols of segment 2 of the subsequent training sequence, starting from the state with appropriate settings for the delays 288-1 to 288-16 inclusive and with an appropriate setting for the delay 238 in the reference vector determination circuit 154, for effecting frequency shift compensation.

Referring briefly to Table 3 above, it will be appreciated that the second column of values gives optimum settings for the gain values, including the varying values $e_1$, $e_2$ and $e_3$, the initial settings for which differ from the initial settings in the first column of values since during subsequent training a fast training is effected during the 48 predefined symbols starting from the state with appropriate settings for the weighting coefficients.

Figure 12:
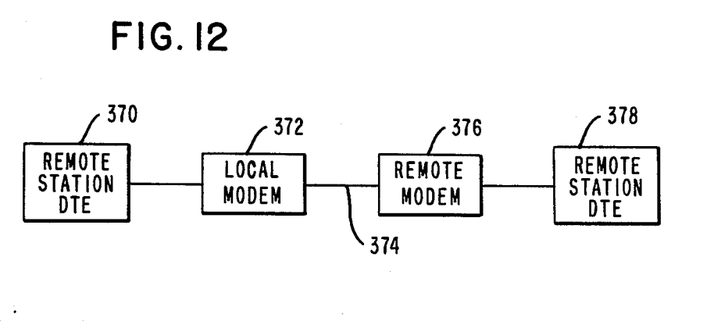
FIG. 12 is a diagram of a half-duplex point-to-point data modem communication system.

Although the invention has been described hereinabove in relation to the multipoint modem configuration shown in FIG. 1, it should be understood that the invention is also applicable to a half-duplex point-to-point configuration. Referring to FIG. 12, such point-to-point configuration includes a local station DTE unit 370 connected to a local modem 372. The local modem 372 is connected over a 2-wire transmission line 374 to a remote modem 376 to which is connected a remote DTE unit 378. On the 2-wire transmission line 374 communication is in a half-duplex mode, wherein transmissions may take place in either direction. Each modem 372, 376 includes a receiver corresponding to that shown in FIG. 3, except that the receiver parameter storage unit 130 utilizes storage locations for the single remote modem only, instead of for a plurality of remote modems. With this half-duplex point-to-point configuration, during the first local to remote and first remote to local transmissions, there is sent a long training sequence as in Table 1, during which receiver parameters and coefficients are acquired and saved, including the contents of the delays 288-1 to 288-16 inclusive and the delay 238 (FIG. 7) at each location.

In summary, there has been described a modem receiver wherein reliable and accurate adaptive phase tracing is achieved to compensate for phase jitter and frequency offset. It will be appreciated that in both multipoint systems and point-to-point systems, successive transmissions may start at random instants, so that it is not possible to start in the phase jitter compensation determination circuit from the state with all previous acquired values and to continue tracking. The present invention enables a very short training to be used wherein fast and reliable compensation for phase jitter and frequency offset is achieved. Thus, a very short training sequence can be used in conjunction with a high data transmission rate.

What is claimed is:

1. A phase perturbation compensation system for compensating a phase-perturbed signal in a data modem comprising:
   phase jitter compensation means adapted to receive a phase error signal and including a tapped delay line having a plurality of output taps;
   weighting means including a corresponding plurality of weighting coefficient generating means adapted to adaptively generate and to apply respective weighting coefficients to said plurality of output taps, thereby forming a plurality of weighted tap signals;
   summing means adapted to sum said weighted tap signals thereby providing a phase error prediction signal;
   feedback means adapted to feed back said error prediction signal to input means of said tapped delay line;
   reference signal determination means responsive to said phase error prediction signal to provide a reference signal;
   error correction means adapted to correct said phase-perturbed signal in dependence on said reference signal; and
   storage means adapted to store a plurality of parameters developed in said weighting coefficient generating means during an initial modem training sequence and to restore the stored parameters to said weighting coefficient generating means during a subsequent modem training sequence.

2. A system according to claim 1, in which said weighting coefficient generating means include respective integrator circuits containing respective delay units and wherein said parameters include the respective contents of said delay units.

3. A system according to claim 2 in which said integrator circuits include respective first multiplier devices receiving a common first multiplier coefficient.

4. A system according to claim 3 in which said phase error signal is applied to a second multiplier device receiving a fixed, second multiplier coefficient, said second multiplier device has an output coupled to a third multiplier device receiving a third variable multiplier coefficient, and said third multiplier device has an output coupled to respective fourth multiplier devices receiving respective inputs from said plurality of output taps and having outputs coupled to respective ones of said integrator circuits.

5. A system according to claim in which the output of said second multiplier device is further coupled to a fifth multiplier device receiving a fourth, variable multiplier coefficient and having an output coupled to said input means of said tapped delay line, and said phase error prediction signal is applied to a sixth multiplier device receiving a fifth, variable multiplier coefficient and having an output coupled to said input means of said tapped delay line.

6. A system according to claim 5 in which first, second and third coefficient generating means are adapted to generate said third, fourth and fifth multiplier coefficients respectively so as to vary during said initial modem training sequence and said subsequent modem training sequence.

7. A system according to claim 6 in which said phase-perturbed signal is an equalized signal generated on an output of an equalizer which is coupled to said error correction means, and said error correction means has an output coupled to an input of decision circuit means which is adapted to provide said phase error signal on a first output thereof.

8. A system according to claim 7 in which said decision circuit means has a second output adapted to provide a quadrature error signal and which is coupled to said reference signal determination means.

9. A system according to claim 8 in which said reference signal determination means includes an integrator device having an input coupled to said second output of said decision circuit and including a delay device, and said storage means is adapted to store a further parameter formed by the value developed in said delay device during said initial modem training sequence.

10. A system according to claim 9 in which said phase error prediction signal is applied to vector generator means having an output line coupled to said reference signal determination means.

11. A system according to claim 10 in which said reference signal determination means includes a feedback loop adapted to receive as an input the output of said integrator device and having an output coupled to a first input of a seventh multiplier device which has a second input coupled to the input of said vector generator means, and an output on which is generated said reference signal.

12. A system according to claim 11 in which said decision circuit means has a third output adapted to provide an in-phase error signal and which is coupled to amplitude determination means adapted to provide an amplitude error correction signal to said error correction means.

13. A system according to claim 12 in which said second and third outputs of said decision circuit means are combined to form a complex-valued bus line which is coupled to combination means, together with said reference signal, thereby providing a feedback signal on a further bus line for application to said equalizer.

14. A system according to claim 13 in which said combination means includes a complex-valued multiplier.

15. A system according to claim 14 in which said decision circuit means includes a slicer having an output coupled to first and second table look-up means, said first table look-up means being utilized to provide said in-phase and quadrature error signals and said second table look-up means being utilized to provide said phase error signal.

* * * * *

UNITED STATES PATENT AND TRADEMARK OFFICE
CERTIFICATE OF CORRECTION

PATENT NO. : 4,849,996

DATED : July 18, 1989

INVENTOR(S) : Adriaan Kamerman

It is certified that error appears in the above-identified patent and that said Letters Patent is hereby corrected as shown below:

Column 11, line 66, after the word "claim", insert --4--.

Signed and Sealed this

Twenty-ninth Day of May, 1990

Attest:

HARRY F. MANBECK, JR.

Attesting Officer　　　　Commissioner of Patents and Trademarks